United States Patent [19]

Maebayashi et al.

[11] Patent Number: 4,529,223
[45] Date of Patent: Jul. 16, 1985

[54] VEHICLE REAR-SUSPENSION MECHANISM

[75] Inventors: Jiro Maebayashi; Takao Kijima, both of Hiroshima, Japan

[73] Assignee: Mazda Motor Corporation, Hiroshima, Japan

[21] Appl. No.: 513,028

[22] Filed: Jul. 12, 1983

[30] Foreign Application Priority Data

| Jul. 15, 1982 | [JP] | Japan | 57-123963 |
| Jul. 27, 1982 | [JP] | Japan | 57-130937 |
| Jul. 27, 1982 | [JP] | Japan | 57-130938 |
| Aug. 4, 1982 | [JP] | Japan | 57-136075 |
| Aug. 4, 1982 | [JP] | Japan | 57-136076 |

[51] Int. Cl.$^3$ .............................. B60G 3/26; B60G 7/00
[52] U.S. Cl. ................................ 280/701; 180/73.3; 267/20 R; 280/689; 280/690
[58] Field of Search ............ 280/701, 660-671, 280/673-675, 688-690, 788; 267/20 R, 57 R; 180/73 R

[56] References Cited

U.S. PATENT DOCUMENTS

| 2,998,265 | 8/1961 | Kozicki | 267/20 R X |
| 3,883,152 | 5/1975 | de Carbon | 280/666 |
| 4,143,887 | 3/1979 | Williams et al. | 267/57 R X |
| 4,153,272 | 5/1979 | Fiedler et al. | 280/669 |
| 4,415,178 | 11/1983 | Hatsushi et al. | 267/57 R X |
| 4,421,332 | 12/1983 | Kosak et al. | 280/701 X |
| 4,436,175 | 3/1984 | Watanabe et al. | 280/688 X |
| 4,440,419 | 4/1984 | Kosak et al. | 280/701 X |

Primary Examiner—Joseph F. Peters, Jr.
Assistant Examiner—Mitchell J. Hill
Attorney, Agent, or Firm—Fleit, Jacobson, Cohn & Price

[57] ABSTRACT

In a rear-suspension mechanism for vehicle, each wheel hub for a rear wheel is supported on a body side support member such as the semi trailing arm of a semi trailing type rear-suspension, the strut hub of a strut type rear-suspension or the like by way of a single ball joint and resilient bushings. The ball joint and the bushings permit displacement of the wheel hub about a point with respect to the body side support member. A stabilizer comprising a body portion extending in the transverse direction of the vehicle body and arm portions extending from opposite ends of the body portion substantially in the longitudinal direction of the vehicle body is supported on the vehicle body for rotation about the body portion. Each arm portion of the stabilizer is connected to one wheel hub at a junction point on the wheel hub. When one rear wheel bumps and the wheel hub supporting the rear wheel is swung upwardly together with the body side support member with respect to the vehicle body, the junction point on the wheel hub tends to move along an arcuate path in a vertical plane extending substantially in the transverse direction of the vehicle body, while the arm portion of the stabilizer connected to the wheel hub tends to move, pushed by the wheel hub, along an arcuate path in a vertical plane extending substantially in the longitudinal direction of the vehicle body. The position of the rear wheel with respect to the body side support member is controlled by a counterforce of the stabilizer produced as a result of the difference between the paths.

18 Claims, 16 Drawing Figures

VEHICLE REAR-SUSPENSION MECHANISM

CROSS-REFERENCE TO RELATED APPLICATIONS

The following are closely related copending U.S. patent applications:

| U.S. Ser. No. | Filing Date |
| --- | --- |
| 489,106 | April 27, 1983 |
| 489,132 | April 27, 1983 |
| 489,492 | April 28, 1983 |
| 489,551 | April 28, 1983 |
| 498,433 | May 26, 1983 |
| 510,813 | July 5, 1983. |

BACKGROUND OF THE INVENTION

1. Field of the Invention

This invention relates to a rear-suspension mechanism for a vehicle, and more particularly to an improved rear-suspension mechanism for a vehicle, exhibiting an excellent toe-in effect.

2. Description of the Prior Art

As is well known, the rear-suspension system for a vehicle is desired to be arranged so that the rear wheels or the tires are caused to toe in during travel, especially during cornering, in order to improve driving stability, driving comfort and the like. The centrifugal force exerted on the vehicle body during cornering acts on the rear-suspension as a lateral force. The tires are desired to counteract the lateral force with an increased resisting force in order to maximize the critical acceleration G in turning. The resisting force against the lateral force can be increased by causing the tires on the rear wheels to toe in to create a slip angle. By increasing the resisting force, the road-gripping force of the rear tires can be improved and the tendency to under-steer can be enhanced, whereby the driving stability of the vehicle is improved The resisting force against the lateral force can be further increased by tilting the outer (with respect to the turning direction) rear wheel to give a negative camber to the outer rear wheel during cornering.

Further, when the accelerator pedal is pushed down during cornering, a driving force is exerted on the tires, while when the accelerator pedal is released during cornering, a braking force is exerted on the tires. The tires tend to toe out upon release of the accelerator pedal which has been depressed, while they tend to toe in upon depression of the accelerator pedal. This causes the tires to toe out and in during cornering, thereby adversely affecting the driving stability of the vehicle. Further, as the rubber bushings for improving driving comfort are disposed inside the treading point of the tires, the braking forces exerted on the tires when the brake pedal is depressed or an engine-brake effect occurs cause the tires to toe out and accordingly the driving stability is lowered. This means that the driving stability is lowered as the driving comfort becomes higher since the softer the rubber bushings are, the more comfortable the vehicle is to ride in. Therefore, there is a need for a rear-suspension system which can cause the rear tires to toe in even when braking forces are exerted thereon through operation of the brake pedal or by the engine-brake effect. The ability of the rear-suspension system to always cause the tires to toe in (This ability will be referred to as "toe-in ability" hereinbelow.) ensures a good driving stability during cornering. The toe-in ability of the rear suspension system is also desirable from the viewpoint of the stability of the vehicle during straight travel at a high speed which is particularly required in case of a sports car. Actually, roads are not completely flat but inherently have bumps and recesses of various sizes which act on the tires as external disturbances in various directions. Further, winds impinging upon the vehicle body in various directions also act on the tires as external disturbances in various directions, and in particular, side winds act on the tires as lateral forces. If the rear-suspension can maintain its toe-in ability even when these external disturbances are exerted on the tires, an understeer condition of the vehicle is always ensured, whereby the vehicle can always be stabilized. The external disturbances act as the lateral force, braking force or driving force described above irrespective of their origins.

Therefore, the rear-suspension system is desired to be able to keep its toe-in ability against any one of the lateral force, braking force (due either to operation of the brake pedal or the engine-brake effect), and driving force. The lateral force is typically a thrust load produced during cornering and comprises a force acting on the treading point of the tires from outside to inside. The braking force due to operation of the brake pedal comprises a force acting on the treading point of the tires from front to rear while the braking force due to the engine-brake effect comprises a force acting on the wheel center of the tires from front to rear. The driving force comprises a force acting on the wheel center from rear to front. The four forces, the acting points thereof and the acting directions are tabulated in the following table.

| force | acting point | direction |
| --- | --- | --- |
| lateral force | treading point | outside to inside |
| brake force | treading point | front to rear |
| engine brake force | wheel center | front to rear |
| driving force | wheel center | rear to front |

In the above table and the following description, the braking force due to operation of the brake pedal and the same due to the engine-brake effect are referred to as "brake force" and "engine-brake force", respectively, in order to clearly distinguish them from each other.

There have been developed various rear-suspension systems which can cause the rear wheels to toe in against the lateral force produced during cornering. For example, there is disclosed in Japanese Patent Publication No. 52(1977)-37649 such a rear-suspension system which utilizes three rubber bushings of different hardnesses. In West German Patent Publication Nos. 2,158,931 and 2,355,954, there are disclosed such rear-suspension systems in which each wheel hub is supported by way of a vertical shaft and a spring. However, these systems are fairly complicated in structure. Further the prior art rear-suspension systems cannot change the camber of the rear wheels to give a negative camber to the outer wheel during cornering, though they can cause the rear wheels to toe in. Further, the prior art rear-suspension systems cannot keep their toe-in ability against all of the four forces described above, but only against the lateral force.

SUMMARY OF THE INVENTION

In view of the foregoing observations and description, the primary object of the present invention is to provide a vehicle rear-suspension mechanism which can control the position of each rear wheel to cause the rear wheel to toe in and/or to give the rear wheel a negative camber upon bump of the rear wheel during cornering, for example.

In one preferred embodiment of the present invention, there is provided a rear-suspension mechanism which can cause each rear wheel to toe in and at the same time to tilt in the direction of negative camber upon bump of the rear wheel.

In another preferred embodiment of the present invention, there is provided a rear-suspension mechanism which can cause each rear wheel to toe in against at least one of the four external forces exerted thereon either during cornering or during straight travel and at the same time can cause each rear wheel to toe in upon bump thereof.

The vehicle rear-suspension mechanism of the present invention comprises wheel supports each of which supports a rear wheel for rotation and is connected to a body side support member, by way of a single ball joint and at least one resilient bushing, which is connected to the vehicle body for pivotal movement, the ball joint connecting the wheel support to the body side support member to permit pivotal movement of the wheel support about a point relative to the body side support member, the resilient bushing resiliently connecting the wheel support to the body side support member, and a stabilizer which has a body portion extending substantially in the transverse direction of the vehicle body and arm portions extending from opposite ends of the body portion substantially in the longitudinal direction of the vehicle body, each arm portion being connected to one wheel support at a junction point on the wheel support, the stabilizer being supported on the vehicle body for rotation about the body portion so that each arm portion can be moved along an arcuate path in a vertical plane extending substantially in the longitudinal direction of the vehicle body while the junction point on the wheel support is adapted to be moved along an arcuate path in a vertical plane extending substantially in the transverse direction of the vehicle body when the rear wheel on the wheel support bumps and the wheel support is swung upwardly together with the body side support member with respect to the vehicle body, whereby the position of each wheel support is controlled with respect to the body side support member by a counterforce of the stabilizer produced against a force exerted thereon in the transverse direction of the vehicle body when the rear wheel on the wheel support bumps.

When the junction point on the wheel support is below the horizontal plane including the junction between the body side support member and the vehicle body about which the body side support member pivots with respect to the vehicle body, the junction point tends to move outwardly from the vertical plane in which the arm portion of the stabilizer tends to move along the arcuate path and a force which tends to outwardly pull the arm portion of the stabilizer is exerted on the arm portion when the rear wheel on the wheel support bumps and the wheel support is swung upwardly together with the body side support member, whereby an inwardly directed counterforce is produced in the stabilizer against the force. This inwardly directed counterforce of the stabilizer can be utilized to cause the rear wheel to toe in and/or to give the rear wheel a negative camber. That is, when the junction point on the wheel support is positioned below said horizontal plane and on the forward side of the ball joint, the forward part of the wheel support is pulled inwardly by the inwardly directed counterforce of the stabilizer to displace the rear wheel thereon in the direction of toe-in about the ball joint. Similarly, when the junction point on the wheel support is positioned below said horizontal plane and above the ball joint, the upper part of the wheel support is pulled inwardly by the inwardly directed counterforce to displace the rear wheel about the ball joint in the direction of negative camber.

On the other hand, when the junction point on the wheel support is on or about the horizontal plane including the junction between the body side support member and the vehicle body, the junction point tends to move inwardly from the vertical plane in which the arm portion of the stabilizer tends to move and a force which tends to inwardly pull the arm portion of the stabilizer when the rear wheel on the wheel support bumps, whereby an outwardly directed counterforce is produced in the stabilizer against the force. This outwardly directed counterforce can be utilized to cause the rear wheel to toe in and/or to give the rear wheel a negative camber. That is, when the junction point on the wheel support is positioned on or about the relevant horizontal plane and on the rearward side of the ball joint, the rearward part of the wheel support is pushed outwardly by the outwardly directed counterforce of the stabilizer to displace the rear wheel thereon in the direction of toe-in about the ball joint. Similarly, when the junction point is on or above the relevant horizontal plane and below the ball joint, the lower part of the wheel support is pushed outwardly by the outwardly directed counterforce of the stabilizer to displace the rear wheel thereon about the ball joint in the direction of negative camber.

By connecting the body side support member and the wheel support by way of a single ball joint and a pair of resilient bushings and by appropriately selecting the arrangement of the ball joint and the resilient bushings, the rear-suspension mechanism of the present invention can cause the rear wheel to toe in, in addition, against at least one of said four external forces exerted on the rear wheel either during cornering or during straight travel, as will be described in detail hereinbelow.

The present invention can be applied to any type of rear-suspension system insofar as it can support the rear wheels to permit them to change their position with respect to the body side support member. For example, the rear-suspension systems to which the present invention can be applied include those of the semi trailing type, strut type, wishbone type and De Dion type. The term "body side support member" should be interpreted as a general term which refers to a support member mounted on the side of the vehicle body, such as a semi trailing arm in the case of a semi trailing type rear-suspension system, a strut in the case of a strut type rear-suspension system, upper and lower arms in the case of a wishbone type rear-suspension system and a De Dion tube in the case of a De Dion type rear-suspension system.

DESCRIPTION OF THE PREFERRED EMBODIMENTS

In the present invention, as described above, either the outwardly directed counterforce or the inwardly directed counterforce of the stabilizer may be utilized to cause the rear wheel to toe in or to give the rear wheel a negative camber. Several embodiments of the present invention in which the outwardly directed counterforce of the stabilizer is utilized are first described referring to FIGS. 1 to 8.

Figure 1:
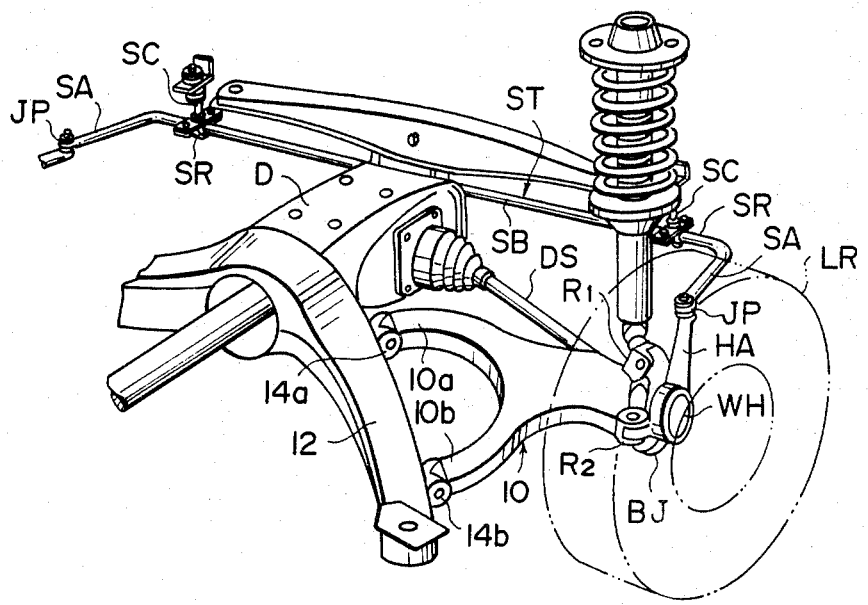
FIG. 1 is a perspective view illustrating a semi trailing type rear-suspension mechanism in accordance with an embodiment of the present invention.

In FIG. 1, which shows a semi trailing type rear-suspension mechanism in accordance with an embodiment of the present invention, a semi trailing arm 10 has a bifurcated end forming a pair of arms 10a and 10b which are connected to a subframe 12 by way of resilient bushings 14 whose axes are rearwardly outwardly directed with respect to the vehicle body so that the semi trailing arm 10 can be swung in a vertical plane about the line passing through the axes of the bushings 14. The left rear wheel LR (Though only one rear wheel and the parts associated therewith are shown in all the drawings, the other rear wheel and the parts associated therewith have the same structure.) is supported on a wheel hub WH (as the wheel support) for rotation. The wheel hub WH is connected to the other end of the semi trailing arm 10 by way of first and second resilient bushings R1 and R2, e.g., rubber bushings, and a single ball joint BJ which permits pivotal movement of the wheel hub WH about a point with respect to the semi trailing arm 10. A drive shaft DS is connected to a differential D at one end and to the left rear wheel LR at the other end.

A stabilizer ST is disposed between the left wheel hub WH and the right wheel hub (not shown) on the rearward side thereof. The stabilizer ST has a laterally extending body portion SB which acts as a torsion bar and a pair of arm portions SA extending forwardly from opposite ends of the body portion SB. The body portion SB of the stabilizer ST is supported near the ends thereof by a pair of resilient bushings SR which are mounted on the vehicle body by way of control links SC to permit rotation of the stabilizer ST about the longitudinal axis of the body portion SB. The wheel hub WH is provided with an arm-like extension HA extending rearwardly therefrom and the arm portion SA of the stabilizer ST is connected with the free end of the arm-like extension HA at a junction point JP thereon.

When the rear wheel LR bumps, the wheel hub WH is swung upwardly about the swinging axis of the semi trailing arm 10, i.e., the line passing through the central axes of the bushings 14, to push upwardly the end of the arm portion SA of the stabilizer ST, thereby generating a torsion in the body portion SB of the stabilizer ST which contributes to the so-called anti-roll effect as is well known in the art.

When the rear wheel LR bumps and the wheel hub WH is swung upwardly together with the semi trailing arm 10 about the swinging axis of the semi trailing arm 10, the junction point JP on the arm-like extension HA tends to move along an arcuate path in a vertical plane substantially perpendicular to the longitudinal direction of the vehicle body (though not exactly perpendicular to the longitudinal direction of the vehicle body since the bushings 14 are inclined rearwardly inwardly), while the end of the arm portion SA of the stabilizer ST tends to move about the rotational axis of the stabilizer ST, i.e., the body portion SB, along an arcuate path in a vertical plane extending substantially in the longitudinal direction of the vehicle body. Thus, when the junction point JP on the arm-like extension HA is on or above the horizontal plane including the swinging axis of the semi trailing arm 10, the junction point JP tends to move inwardly away from the vertical plane in which the end of the arm portion SA of the stabilizer tends to move and an inwardly directed force is exerted on the arm portion SA, whereby an outwardly directed counterforce is produced in the stabilizer ST. In this embodiment, the junction point JP is positioned above the relevant horizontal plane as clearly shown in FIG. 1. On the other hand, when the junction point JP is below the relevant plane, the junction point JP tends to move outwardly away from the vertical plane in which the end of the arm portion SA tends to move and an outwardly directed force is exerted on the arm portion SA, whereby an inwardly directed counterforce is produced in the stabilizer ST. In the embodiments shown in FIGS. 9 to 12, the junction point JP is positioned below the horizontal plane including the swinging axis of the body side support member to utilize the inwardly directed counterforce of the stabilizer.

Again in FIG. 1, the junction point JP, at which the counterforce of the stabilizer ST acts on the wheel hub WH, is on the rearward side of the ball joint BJ. Accordingly, when the outwardly directed counterforce of the stabilizer ST is produced upon bump of the rear wheel LR, the rearward part of the wheel hub WH is pushed outwardly, whereby the rear wheel LR thereon is displaced about the ball joint BJ in the clockwise direction as seen from above. Thus the rear wheel LR is caused to toe in upon bump thereof.

Figure 2:
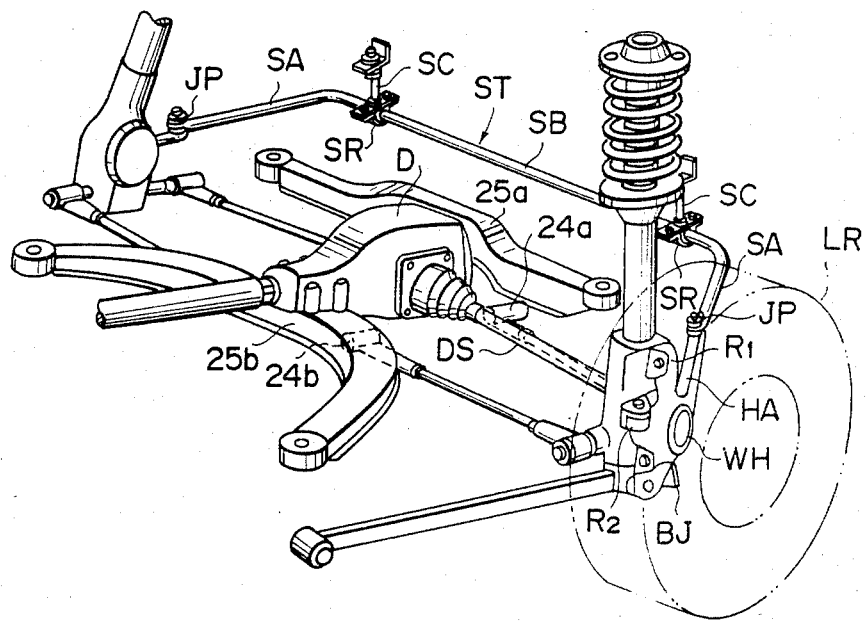
FIG. 2 is a perspective view illustrating a strut type twin-link suspension mechanism in accordance with another embodiment of the present invention.

In FIG. 2, which shows a strut type twin link suspension in accordance with another embodiment of the present invention, a strut hub 20 (as the body side support member) supports thereon a strut 21. A pair of suspension arms 22 are connected to the forward and rearward ends of the strut hub 20 by way of resilient bushings 23 at one end thereof. The other end of the rearward suspension arm 22 is connected by way of a resilient bushing 24a to a rearward sub-frame 25a constituting a part of the vehicle body. Similarly, the other end of the forward suspension arm 22 is connected by way of a resilient bushing 24b to a forward subframe 25b constituting a part of the vehicle body. The central axes of the bushings 24a and 24b are aligned with each other in the longitudinal direction of the vehicle body and the strut hub 20 can be vertically swung about the line passing through the central axes of the bushings 24a and 24b. A wheel hub WH supporting the left rear wheel LR is connected to the strut hub 20 by way of first and second resilient bushings R1 and R2, and a single ball joint BJ which permits pivotal movement of the wheel hub WH about a point with respect to the strut hub 20.

As in the embodiment shown in FIG. 1, a stabilizer ST is disposed between the left wheel hub WH and the right wheel hub on the rearward side thereof. The stabilizer ST has a laterally extending body portion SB which acts as a torsion bar and a pair of arm portions SA extending forwardly from opposite ends of the body portion SB. The body portion SB of the stabilizer ST is supported near the ends thereof by a pair of resilient bushings SR which are mounted on the vehicle body by way of control links SC to permit rotation of the stabilizer ST about the longitudinal axis of the body portion SB. The wheel hub WH is provided with an arm-like extension HA extending rearwardly therefrom and the arm portion SA of the stabilizer ST is connected with the free end of the stabilizer ST at a junction point JP thereon.

When the rear wheel LR bumps, the wheel hub WH is swung upwardly with respect to the vehicle body about the swinging axis of the strut hub 20, i.e., the line passing through the central axes of the bushings 24a and 24b, to push upwardly the end of the arm portion SA of the stabilizer ST.

As in the embodiment shown in FIG. 1, the junction point JP on the wheel hub WH is positioned above the horizontal plane including the swinging axis of the strut hub 20 and on the rearward side of the ball joint JB. Accordingly, the rear wheel LR is caused to toe in upon bump thereof in the same manner as that in the embodiment shown in FIG. 1.

As will be apparent to those skilled in the art from the description above, when the junction point JP on the wheel hub WH is below the ball joint BJ in each of the embodiments shown in FIGS. 1 and 2, the wheel hub WH is also displaced about the ball joint BJ in the counterclockwise direction as seen from the rear of the vehicle body by the outwardly directed counterforce of the stabilizer ST. That is, by locating the junction point JP below the ball joint BJ or connecting the wheel hub WH and the arm portion SA of the stabilizer ST below the ball joint BJ, the rear wheel LR can be tilted in the direction of negative camber upon bump thereof.

Though in the above embodiments, a pair of resilient bushings R1 and R2 are used, a single resilient bushing may be used in order to obtain toe-in and/or negative camber of the rear wheel in response to bump thereof. Further, though the body portion SB of the stabilizer ST is disposed on the rearward side of the wheel hubs with the arm portion SA extending forwardly from the body portion SB in both the embodiments shown in FIGS. 1 and 2, the body portion SB may be disposed on the forward side of the wheel hubs with the arm portion SA extending rearwardly therefrom. However, in any case, the junction point JP on the wheel hub should be on or above the horizontal plane including the swinging axis of the body side support member, i.e., the semi trailing arm 10 in the case of the embodiment of FIG. 1 and the strut hub 20 in the case of the embodiment of FIG. 2, in order to utilize the outwardly directed counterforce of the stabilizer ST.

Figure 3:
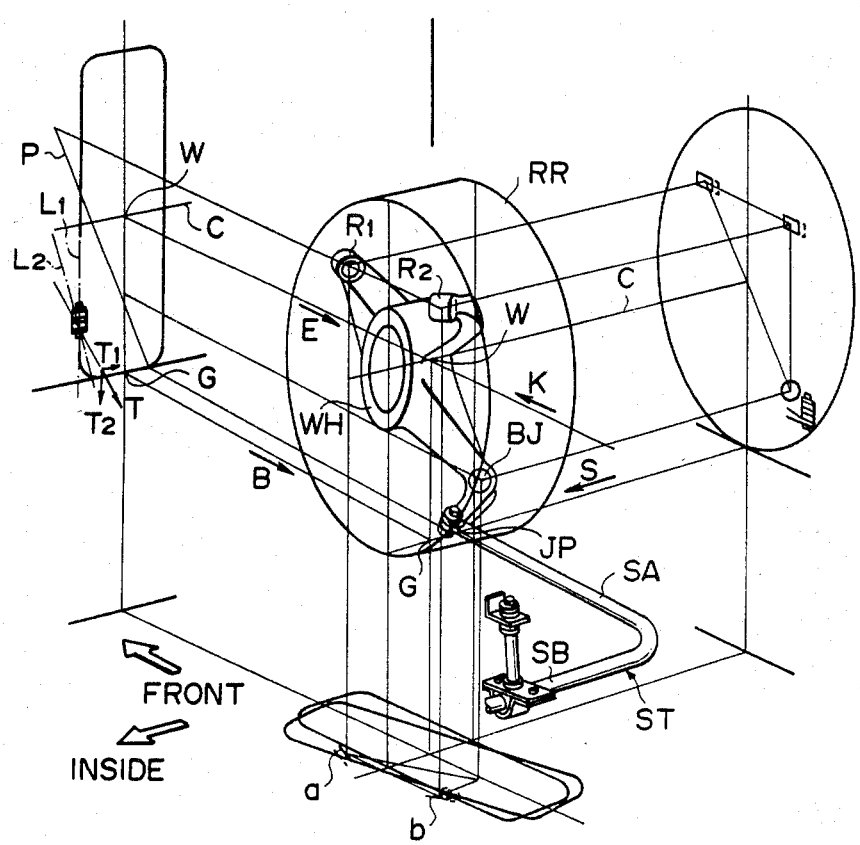
FIG. 3 is a combined schematic view for illustrating the principle of operation of a rear-suspension mechanism in accordance with still another embodiment of the present invention, with a schematic perspective view of the right rear wheel as viewed from the left rear quarter shown in the middle of the Figure, and with projections from the rear, left side and above being on the left and right sides of the perspective view and below it, respectively.

FIG. 3 is a combined schematic view of a right rear wheel (indicated at RR) of a vehicle as viewed from the left rear quarter for illustrating the principle of operation of still another preferred embodiment of the present invention which can cause the rear wheel to toe in and can give the rear wheel a negative camber upon bump thereof, and at the same time can cause the rear wheel to toe in against the external described above which are exerted on the rear wheels either during cornering or during straight travel. As described above, by connecting the body side support member and the wheel support by way of a single ball joint and a pair of resilient bushings and by appropriately selecting the arrangement of the ball joint and the resilient bushings, the rear wheels can be caused to toe in against the lateral force exerted on the treading point of the rear wheel from outside to inside, the brake force exerted on the treading point of the same from front to rear, the engine-brake force exerted on the center of the same from front to rear, and the driving force exerted on the center of the same from rear to front.

In order to discuss the position of the ball joint and the resilient bushings, a coordinate plane having its origin on the center W of the rear wheel, its abscissa on the horizontal line passing through the center W of the rear wheel, and its ordinate on the vertical line passing through the center W of the rear wheel is imagined as viewed from the left hand side of the vehicle body. Each of the quadrants on the coordinate plane should be interpreted, in this specification, to include the part of the abscissa and the ordinate separating the quadrant from the other quadrants. For example, quadrant I should be interpreted to include the right side half of the abscissa and the upper half of the ordinate.

In order to explain the principle of operation by which the rear wheels are caused to toe in against the external forces exerted thereon, a vertical axis L passing through the ball joint BJ, a horizontal axis M passing through the ball joint BJ in parallel to the axle, and a horizontal axis N passing through the ball joint BJ in the longitudinal direction of the vehicle body are imagined. Further, the position of the plane including the centers of the ball joint BJ and the resilient bushings R1 and R2 must be discussed. This plane is represented by line P in the projection from the rear in FIG. 3 and other figures similar to FIG. 3. In other words, the line P represents the intersectional line between the plane including the centers of the ball joint BJ and the bushings R1 and R2, and the vertical plane including the central axis C of the rear wheel LR. The relevant plane will be referred to as "the plane P", hereinbelow.

Generally, when the ball joint BJ is to the rear of the wheel center W, i.e., in quadrant I or IV, a turning moment to displace the wheel hub WH in the counterclockwise direction as seen from above, i.e., the direction of toe-in, is generated about the vertical axis L when a force is exerted on the treading point G of the rear wheel from outside to inside. Thus, in the present invention, the ball joint BJ is positioned in quadrant I or IV. When said plane P is inwardly offset from the wheel center W at the height of the wheel center W, a turning moment in the direction of toe-in (counterclockwise direction as seen from above) is generated about the vertical axis L when a force is exerted on the wheel center W from rear to front, while a turning moment in the direction of toe-out is generated about the vertical axis L when a force is exerted on the wheel center W from front to rear. On the other hand, when the plane P is outwardly offset from the wheel center W at the height thereof, a turning moment in the direction of toe-in is generated about the vertical axis L when a force is exerted on the wheel center W from front to rear, and a turning moment in the direction of toe-out is generated about the vertical axis L when a force is exerted on the wheel center W from rear to front. Accordingly, when the plane P is inwardly offset from the wheel center W at the height thereof, the rear wheel is effectively caused to toe in against the driving force which acts on the wheel center W from rear to front. However, in this case, the rear wheel will be caused to toe out when the engine-brake force is exerted on the wheel center from front to rear. On the other hand, when the plane P is outwardly offset from the wheel center W at the height thereof, the rear wheel is caused to toe in, when the engine-brake force is exerted on the wheel center W, while the rear wheel is caused to toe out when the driving force is exerted on the wheel center W. Similarly, when the plane P is outwardly offset from the treading point G at the height thereof, a turning moment in the direction of toe-in is generated about the vertical axis L when a force is exerted on the treading point G from front to rear. Thus, by outwardly offsetting the plane P from the treading point G, the rear wheel can be effectively caused to toe in against the brake force which acts on the treading point G from front to rear. The lateral force, brake force, engine-brake force and driving force are indicated at S, B, E and K, respectively.

A schematic perspective view of the right rear wheel of a vehicle as viewed from the left rear quarter is shown in the middle of FIG. 3, and projections from the rear, left side and above are positioned on the left and right sides of the perspective view and below it, respectively. In this embodiment, the ball joint BJ is in quadrant IV, and the first and second bushings R1 and R2 are in quadrants I and II, respectively. The plane P including the centers of the ball joint BJ and the bushings R1 and R2 is outwardly offset from the treading point G at the height thereof and is inwardly offset from the wheel center W at the height thereof. The ball joint BJ is positioned at an intermediate portion of an arm-like extension 30 extending rearwardly from the wheel hub WH. The stabilizer ST is disposed on the rearward side of the wheel hub WH with the arm portion SA extending forwardly from the body portion SB. The end of the arm portion SA is connected to the rear end of the arm-like extension 30. That is, the junction point JP is on the rear end of the arm-like extension 30. The rear end portion of the arm-like extension 30 is inclined downwardly from the ball joint BJ, and thus, the junction point JP is positioned on the rearward side and below the ball joint BJ. At the same time, the junction point JP is positioned above the horizontal plane including the swinging axis of the body side support member though this axis is not shown.

When the right rear wheel RR bumps and the wheel hub WH is swung upwardly with respect to the vehicle body about the swinging axis of the body side support member, the junction point JP on the arm-like extension 30 tends to move along a path indicated at L2 in the projection from the rear of the vehicle body, while the connected end of the arm portion SA of the stabilizer ST tends to move along a path indicated at L1 in the same projection. As shown in the projection, the path L1 along which the connected end of the arm portion SA tends to move is vertical as viewed from the rear, while the path L2 along which the junction point JP on the arm-like extension 30 of the wheel hub WH tends to move extends from the rest position thereof inclined inwardly with respect to the path L1. Therefore, an inwardly upwardly directed force is exerted on the arm portion SA of the stabilizer ST to produce a counterforce T therein. As shown in the projection from the rear in FIG. 3, the counterforce T of the stabilizer ST is actually directed downwardly outwardly, and accordingly includes an outwardly directed horizontal component T1 and a downwardly directed vertical component T2. By the horizontal component T1 of the counterforce T of the stabilizer ST, the rear wheel RR is caused to toe in and tilt in the direction of negative camber upon bump thereof as described above, since the junction point JP is on the rearward side of the ball joint BJ and below the same. That is, the horizontal component T1 generates a turning moment to displace the wheel hub WH about the vertical axis L in the counterclockwise direction as seen from above and a turning moment to displace the wheel hub WH about the horizontal axis N in the counterclockwise direction as seen from the rear. At the same time, the vertical component T2 of the counterforce T of the stabilizer ST generates a turning moment to displace the wheel hub WH about the horizontal axis M in the clockwise direction. By converting this turning moment into a force to inwardly displace the forward part of the wheel hub WH and to outwardly displace the rearward part of the same, the rear wheel RR can be caused to toe in more effectively. For this purpose and for other purposes which will become apparent later, the central axis of the second bushing R2 in quadrant I is directed rearwardly outwardly and the central axis of the first bushing R1 in quadrant II is directed rearwardly inwardly. By this orientation of the central axes of the bushings R1 and R2 and due to the fact that a resilient bushing is generally deformed more easily in the axial direction than the transverse direction, the wheel hub WH is guided in the direction of toe-in when it is displaced clockwisely about the horizontal axis M.

When the lateral force S is exerted on the treading point G of the rear wheel RR from outside to inside either during cornering or during straight travel, a turning moment in the counterclockwise direction as seen from above is genetated about the vertical axis L since the ball joint BJ is to the rear of the wheel center W, i.e., in quadrant IV, and accordingly, the wheel hub WH is displaced in the direction of toe-in deforming the bushings R1 and R2, whereby the wheel RR is caused to toe in. Since the outer rear wheel bumps during cornering and at the same time the lateral force S is exerted on the outer rear wheel during cornering, the outer rear wheel can be effectively caused to toe in, during cornering, by both the counterforce of the stabilizer ST and the counterclockwise turning moment about the vertical axis L generated by the lateral force S.

When the brake force B is exerted on the treading point G from front to rear, a turning moment in the direction of toe-in (the counterclockwise direction as seen from above) is generated about the vertical axis L by virtue of the fact that the plane P is outwardly offset from the treading point G at the height thereof, and at the same time a turning moment to displace the wheel counterclockwisely (as seen from the left of FIG. 3) is generated about the horizontal axis M. The latter turning moment is converted into a force to cause the wheel to toe out through the guiding effect of the bushings R1 and R2. If the latter turning moment is larger than the former turning moment, the wheel cannot be caused to toe in. This can be avoided by providing a stopper in front of one of the bushings R1 and R2.

When the engine-brake force E is exerted on the wheel center W from front to rear, a turning moment to clockwisely displace the wheel is generated about the horizontal axis M. This turning moment is converted into a force to cause the wheel to toe in through the guiding effect of the bushings R1 and R2 as described above with respect to the vertical component T2 of the counterforce T of the stabilizer ST. At the same time, the engine-brake force E generates a turning moment in the direction of toe-out about the vertical axis L since the plane P is inwardly offset from the wheel center W. However, the wheel can be caused to toe in totally since the toe-in effect due to the turning moment about the horizontal axis M is larger than the toe-out effect due to the turning moment about the vertical axis L. This is because the rubber bushings R1 and R2 are apt to be deformed more easily in the axial direction than in the transverse direction, and the amount of the offset of the ball joint BJ from the wheel center W in the vertical direction is larger than that in the horizontal direction.

When the driving force K is exerted on the wheel center W from rear to front, a turning moment in the counterclockwise direction is generated about the horizontal axis M and is converted into a force to cause the wheel to toe out through the guiding effect of the bushings R1 and R2. This force overcomes the turning moment in the direction of toe-in generated about the vertical axis L to cause the wheel to toe in since the driving force K acts on the wheel center W in the direction opposite to the engine-brake force E. However, the wheel can be caused to toe in by providing a stopper in front of one of the bushings R1 and R2 to restrict the counterclockwise rotational displacement about the horizontal axis M. When the stopper is provided in front of one of the bushings R1 and R2, a turning moment to turn the wheel in the direction of toe-in is generated about the line connecting the ball joint BJ and the bushing provided with the stopper, whereby the wheel is caused to toe in when the driving force K is exerted on the wheel center W.

Thus the rear-suspension mechanism in accordance with the embodiment shown in FIG. 3 can cause the rear wheel to toe in when it bumps during cornering and at the same time can cause the rear wheel to toe in against all of the four external forces, i.e., the lateral force S, the brake force B, the engine-brake force E and the driving force K, either during cornering or during straight travel.

Figure 4A:
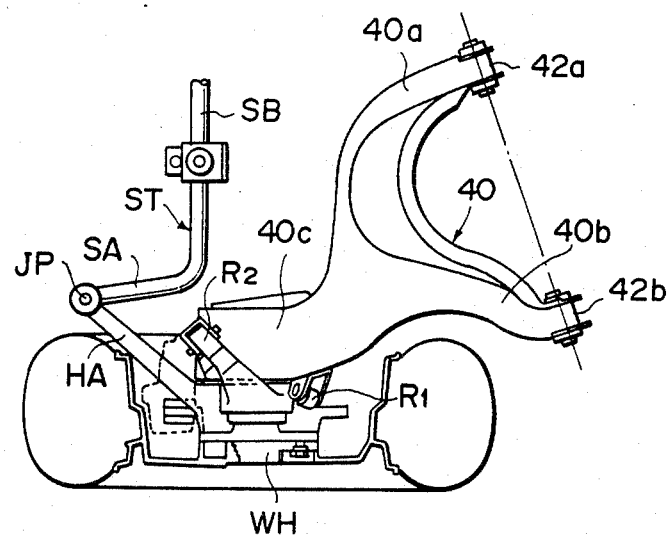
FIG. 4A is a fragmentary plan view of the right side part of a semi trailing type rear-suspension mechanism in accordance with still another embodiment of the present invention, with a part of the right rear wheel cut away.
Figure 4B:
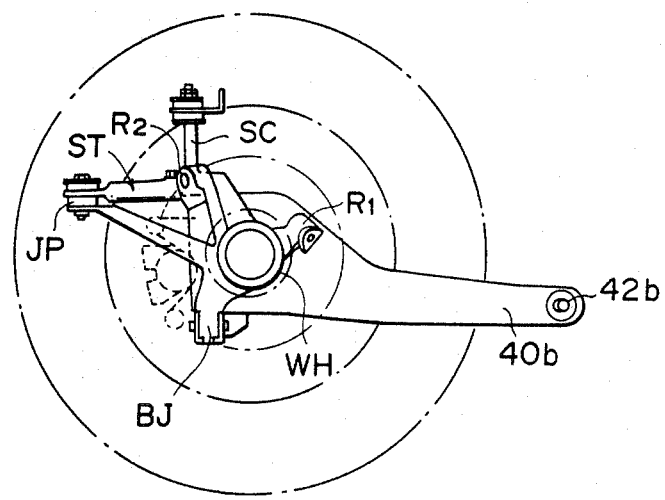
FIG. 4B is a side view of FIG. 4A seen from the right side with the right rear wheel shown by a chained line.
Figure 4C:
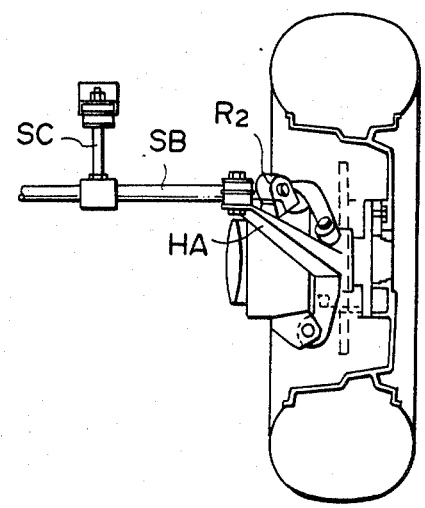
FIG. 4C is a side view of FIG. 4A seen from the left side.

FIGS. 4A to 4C show a semi trailing type rear-suspension mechanism in accordance with still another embodiment of the present invention. A semi trailing arm 40 has a bifurcated end forming a pair of arms 40a and 40b which are pivoted on the vehicle body (not shown) at pivoting portions 42a and 42b, respectively. A wheel hub WH is connected to the other end 40c of the semi trailing arm 40 by way of a ball joint BJ and first and second resilient bushings R1 and R2.

A stabilizer ST is disposed between the left and right wheel hubs on the rearward side thereof. The stabilizer ST has a laterally extending body portion SB and a pair of arm portions SA extending rearwardly from opposite ends of the body portion SB. The body portion SB of the stabilizer ST is supported near the ends thereof on the vehicle body by way of a pair of control links SC. The wheel hub WH is provided with an arm-like extension HA extending rearwardly therefrom and the arm portion SA of the stabilizer ST is connected with the free end of the arm-like extension HA at a junction point JP thereon.

Though the arm portions SA of the stabilizer ST extend rearwardly from the body portion SB in this embodiment, the relative positions of the ball joint BJ, the bushings R1 and R2, and the junction point JP are substantially the same as those in the embodiment shown in FIG. 3, and accordingly the principle of operation of this embodiment is substantially the same as that of the embodiment shown in FIG. 3.

Figure 5A:
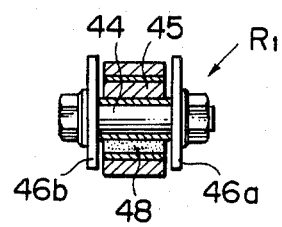
FIG. 5A is a longitudinal sectional view of the first bushing employed in the embodiment shown in FIGS. 4A to 4C.
Figure 5B:
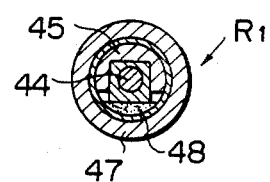
FIG. 5B is a transverse sectional view of the first bushing of FIG. 5A.
Figure 6A:
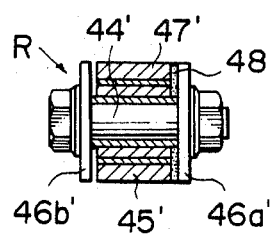
FIG. 6A is a longitudinal sectional view of the second busing employed in the embodiment shown in FIGS. 4A to 4C.
Figure 6B:
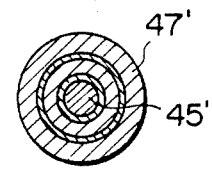
FIG. 6B is a transverse sectional view of the second bushing of FIG. 6A.
Figure 7:
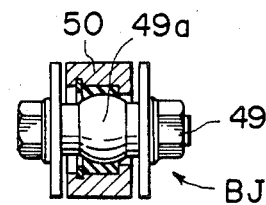
FIG. 7 is a sectional view of the ball joint employed in the embodiment shown in FIGS. 4A to 4C.

FIGS. 5A and 5B show the first bushing R1 which is forwardly positioned with respect to the second bushing R2, FIGS. 6A and 6B show the second bushing R2, and FIG. 7 shows the ball joint BJ.

The first bushing R1 comprises a rod portion 44 which is fixedly connected to the end 40c of the semi trailing arm 40, and a cylindrical rubber portion 45 surrounding the intermediate portion of the rod portion 44. The rod portion 44 has a pair of flanges 46a and 46b on the front and rear ends thereof. The first bushing R1 is inserted into a bearing portion 47 formed integrally with the wheel hub WH. The side of the rubber portion 45 facing the inside of the vehicle body is stiffened by providing the side with hard rubber or a stopper 48. The opposite side of the rubber portion 45 is relatively soft. Accordingly, the first bushing R1 permits inward displacement of the wheel hub WH but restricts outward displacement of the same. That is, the first bushing R1 permits displacement of the wheel hub WH in the direction of toe-in but prevents displacement of the same in the direction of toe-out since the first bushing R1 supports the forward part of the wheel hub WH.

As shown in FIGS. 4A and 4B, the second bushing R2 which is in quadrant I directed rearwardly outwardly comprises a rod portion 44' which is fixedly connected to the end 40c of the semi trailing arm 40, and a cylindrical rubber portion 45' surrounding the rod portion 44'. The rod portion 44' has a pair of flanges 46a' and 46b' on the front and rear ends thereof. In the second bushing R2, the hardness of the rubber portion 45' is uniform as can be seen from FIG. 6B, and instead, the second bushing R2 is provided with a stopper 48 between the front side flange 46a' and the front end of the bearing portion 47' of the wheel hub to prevent the counterclockwise displacement of the wheel hub WH about the horizontal axis M and the forward displacement of the bushing R2.

As shown in FIG. 7, the ball joint BJ includes a rod portion 49 which is fixedly connected to the end 40c of the semi trailing arm 40. The rod portion 49 is spherically formed at the middle portion thereof as indicated at 49a. The spherical portion 49a forms the ball of the ball joint which permits rotational displacement of the wheel hub WH about a point. Reference numeral 50 indicates the bearing portion formed in the wheel hub WH.

Figure 8:
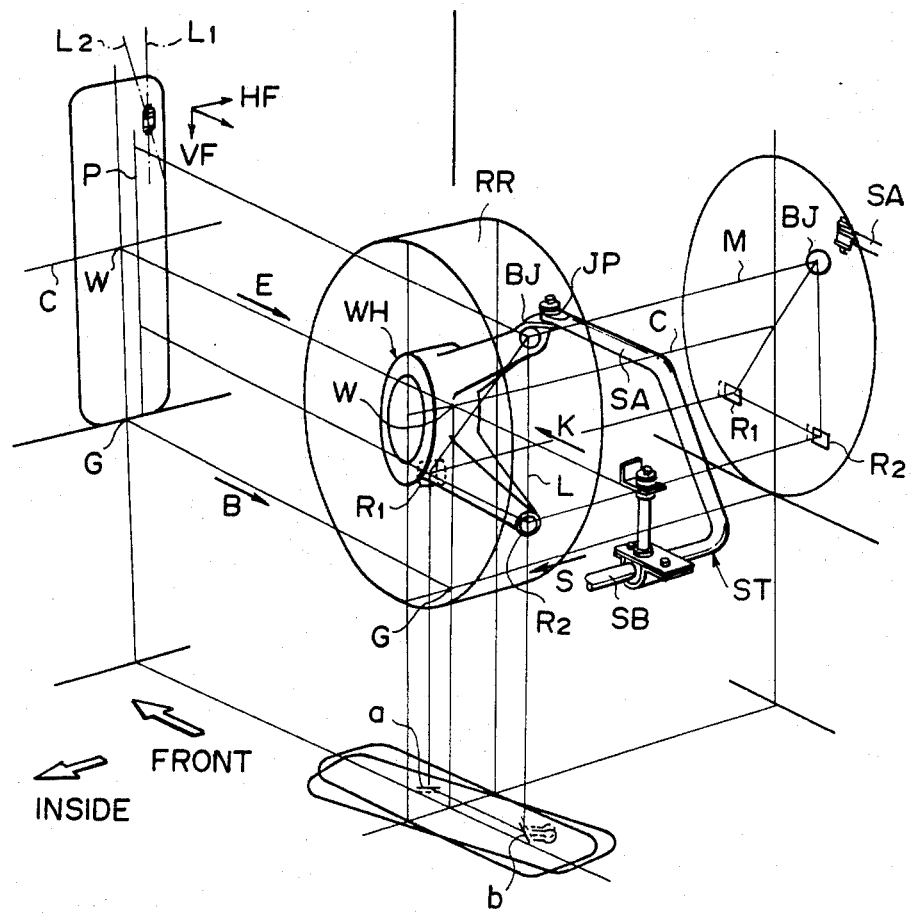
FIG. 8 is a combined schematic view similar to FIG. 3 but of a rear-suspension mechanism in accordance with still another embodiment of the present invention.

FIG. 8 shows still another embodiment of the present invention. This embodiment is similar to that shown in FIG. 3. However, the ball joint BJ is in quadrant I and the resilient bushings R1 and R2 are in quadrant III and IV, respectively, in this embodiment. The central axis a of the first bushing R1 in quadrant III is directed forwardly inwardly and the central axis b of the second bushing R2 in quadrant IV is directed forwardly outwardly to displace the wheel hub WH in the direction of toe-in in response to the displacement of the wheel hub WH in the clockwise direction about the horizontal axis M. Further, the junction point JP is positioned on the rearward side of the ball joint BJ and above the swinging axis of the body side support member (not shown) as in the embodiment of FIG. 3. However, the plane P including the centers of the ball joint BJ and the resilient bushings R1 and R2 is outwardly offset from both the wheel center W and the treading point G at their respective heights.

In this embodiment, the rear wheel RR is caused to toe in upon bump thereof in a manner similar to that in the embodiment of FIG. 3 by the horizontal component T1 and the vertical component T2 of the counterforce T of the stabilizer ST since the junction point JP on the wheel hub WH is on the rearward side of the ball joint BJ and above the horizontal plane including the swinging axis of the body side support member, and the central axes of the bushings R1 and R2 are directed to displace the wheel hub WH in response to the clockwise displacement of the same about the horizontal axis M. Further, the rear wheel RR can be displaced against the lateral force S since the ball joint BJ is in the rear of the wheel center W.

When the brake force B is exerted on the treading point G of the wheel RR from front to rear, a turning moment in the direction of toe-in (the counterclockwise direction as seen from above) is generated about the vertical axis L by virtue of the fact that the plane P is outwardly offset from the treading point G at the height thereof, and at the same time a turning moment to displace the wheel RR counterclockwisely as seen from the left of FIG. 8 is generated about the horizontal axis M. The latter turning moment is converted into a force to cause the wheel RR to toe out through the guiding effect of the bushings R1 and R2. If the latter turning moment is larger than the former turning moment, the wheel RR cannot be caused to toe in. This can be avoided by providing a stopper behind one of the bushings R1 and R2.

When the engine-brake force E is exerted on the wheel center W from front to rear, a turning moment in the direction of toe-in is generated about the vertical axis L by virtue of the fact that the plane P is outwardly offset from the wheel center W, and at the same time a turning moment to displace the wheel RR in the counterclockwise direction is generated about the horizontal axis M. The latter turning moment is converted into a force to cause the wheel RR to toe out through the guiding effect of the bushings R1 and R2. However, the force to cause the wheel to toe out can be limited by providing a stopper behind one of the bushings R1 and R2. When the stopper is provided behind one of the bushings, the wheel RR can be displaced only in the direction of toe-in about a line connecting the ball joint BJ and the bushing provided with the stopper.

When the driving force K is exerted on the wheel center W from rear to front, a turning moment to displace the wheel in the direction of toe-out is generated about the vertical axis L while a turning moment to displace the wheel RR in the clockwise direction, which is converted into a force to displace the wheel RR in the direction of toe-in through the guiding effect of the bushings R1 and R2, is generated about the horizontal axis M, and the wheel RR is, in total, caused to toe in. However, the wheel RR can be positively caused to toe in by providing a stopper behind one of the bushings R1 and R2 for restricting the counterclockwise rotational displacement of the wheel RR about the horizontal axis M.

In the above embodiments, the outwardly directed horizontal component of the counterforce of the stabilizer ST is utilized to cause the rear wheel to toe in upon bump thereof. Therefore, the junction point JP on the wheel hub WH is positioned on the rearward side of the ball joint BJ and thus the vertical component of the counterforce of the stabilizer ST generates a turning moment to displace the wheel hub WH in the clockwise direction about the horizontal axis M. The resilient bushings R1 and R2 are directed to displace the wheel hub WH in the direction of toe-in in response to the clockwise displacement of the wheel hub WH about the horizontal axis M. Thus, the orientations of the bushings R1 and R2 need not be limited to those shown in the drawings. For example, the first bushing R1 in the embodiment of FIG. 3 may be positioned in quadrant III to extend in a horizontal plane or with its forward part positioned higher than its rearward part. In this case, the central axis of the bushing R1 is directed forwardly inwardly. Further, the first bushing R1 in the embodiment of FIG. 8 may be positioned in quadrant II to extend in a horizontal plane or with its forward part positioned lower than its rearward part. In this case, the central axis of the bushing R1 is directed rearwardly inwardly.

Now other embodiments of the present invention in which the inwardly directed counterforce of the stabilizer is utilized are described referring to FIGS. 9 to 12.

Figure 9:
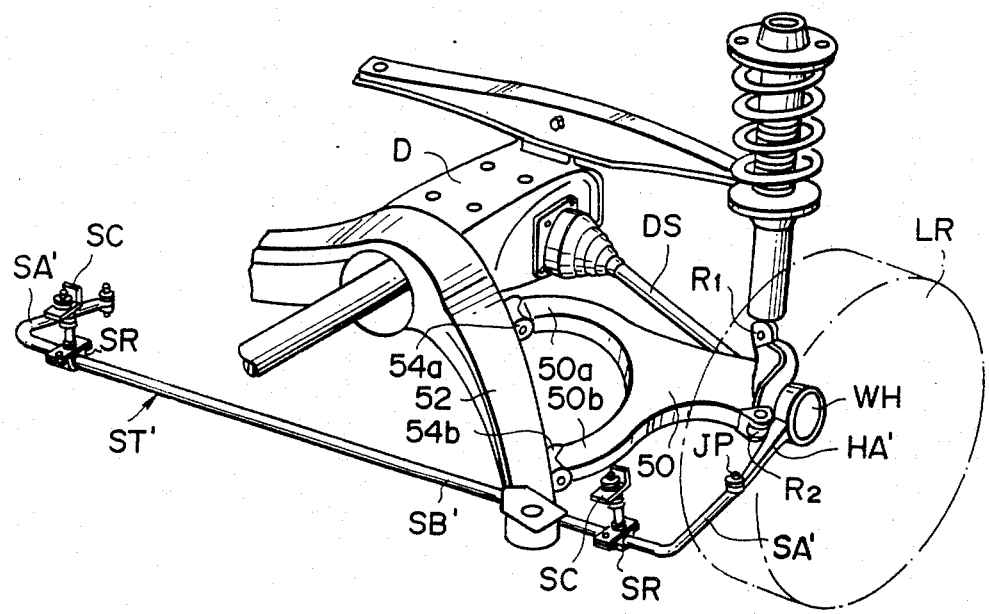
FIG. 9 is a perspective view illustrating a semi trailing type rear-suspension mechanism in accordance with another embodiment of the present invention.

In FIG. 9, which shows a semi trailing type rear-suspension mechanism in accordance with still another embodiment of the present invention, a semi trailing arm 50 has a bifurcated end forming a pair of arms 50a and 50b which are connected to a sub-frame 52 by way of resilient bushings 54 whose axes are rearwardly outwardly directed with respect to the vehicle body so that the semi trailing arm 50 can be swung in a vertical plane about the line passing through the axes of the bushings 54. The left rear wheel LR (Though only one rear wheel and the parts associated therewith are shown in all the drawings, the other rear wheel and the parts associated therewith have the same structure.) is supported on a wheel hub WH (as the wheel support) for rotation. The wheel hub WH is connected to the other end of the semi trailing arm 50 by way of first and second resilient bushings R1 and R2, e.g., rubber bushings, and a single ball joint BJ (not visible in FIG. 9) which permits pivotal movement of the wheel hub WH about a point with respect to the semi trailing arm 50 as in the embodiment shown in FIG. 1. A drive shaft DS is connected to a differential D at one end and to the left rear wheel LR at the other end.

A stabilizer ST' is disposed between the left wheel hub WH and the right wheel hub (not shown) on the forward side thereof. The stabilizer ST' has a laterally extending body portion SB' which acts as a torsion bar and a pair of arm portions SA' extending forwardly from opposite ends of the body portion SB'. The body portion SB' of the stabilizer ST' is supported near the ends thereof by a pair of resilient bushings SR which are mounted on the vehicle body by way of control links SC to permit rotation of the stabilizer ST' about the body portion SB'. The wheel hub WH is provided with an arm-like extension HA' extending forwardly therefrom and the arm portion SA' of the stabilizer ST is connected with the free end of the arm-like extension HA' at a junction point JP thereon.

When the rear wheel LR bumps, the wheel hub WH is swung upwardly about the swinging axis of the semi trailing arm 50, i.e., the line passing through the central axes of the bushings 54, to push upwardly the end of the arm portion SA' of the stabilizer ST', thereby generating a torsion in the body portion SB' of the stabilizer ST' which contributes to the so-called anti-roll effect as is well known in the art.

When the rear wheel LR bumps and the wheel hub WH is swung upwardly together with the semi trailing arm 50 about the swinging axis of the semi trailing arm 50, the junction point JP on the arm-like extension HA' tends to move along an arcuate path in a vertical plane substantially perpendicular to the longitudinal direction of the vehicle body (though not exactly perpendicular to the longitudinal direction of the vehicle body since the bushings 54 are inclined rearwardly inwardly), while the end of the arm portion SA' of the stabilizer ST' tends to move about the rotational axis of the stabilizer ST', i.e., the body portion SB', along an arcuate path in a vertical plane extending substantially in the longitudinal direction of the vehicle body. Thus, when the junction point JP on the arm-like extension HA' is below the horizontal plane including the swinging axis of the semi trailing arm 50, the junction point JP tends to move outwardly away from the vertical plane in which the end of the arm portion SA' of the stabilizer tends to move and an outwardly directed force is exerted on the arm portion SA', whereby an inwardly directed counterforce is produced in the stabilizer ST'. In this embodiment, the junction point JP is positioned below the relevant horizontal plane as clearly shown in FIG. 9.

Further, the junction point JP, at which the counterforce of the stabilizer ST' acts on the wheel hub WH, is on the forward side of the ball joint BJ. Accordingly, when the inwardly directed counterforce of the stabilizer ST' is produced upon bump of the rear wheel LR, the forward part of the wheel hub WH is pulled inwardly, whereby the rear wheel LR thereon is displaced about the ball joint BJ in the clockwise direction as seen from above. Thus the rear wheel LR is caused to toe in upon bump thereof.

Figure 10:
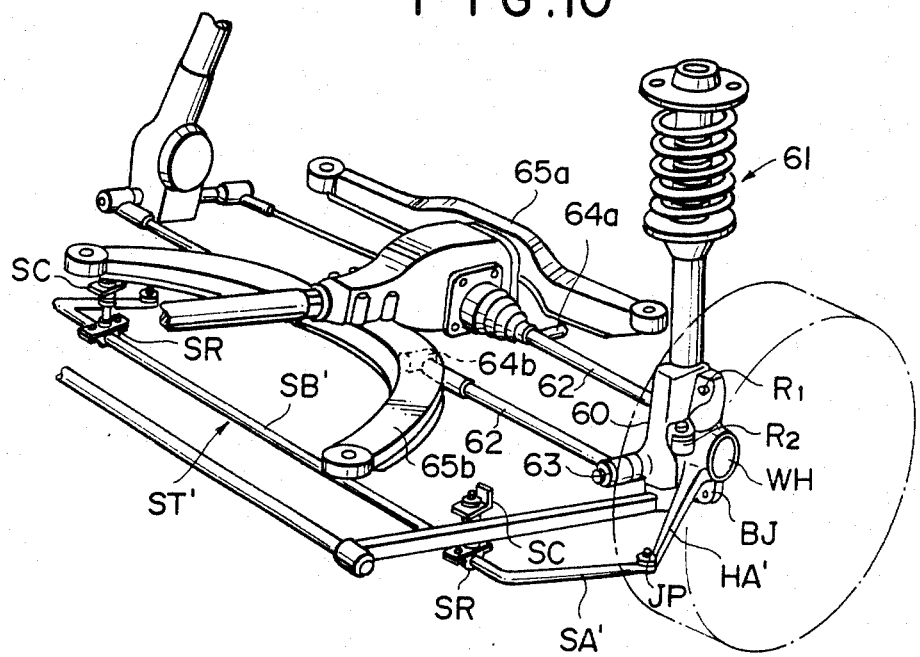
FIG. 10 is a perspective view illustrating a strut type twin-link suspension mechanism in accordance with still another embodiment of the present invention.

In FIG. 10, which shows a strut type twin link suspension in accordance with another embodiment of the present invention, a strut hub 60 (as the body side support member) supports thereon a strut 61. A pair of suspension arms 62 are connected to the forward and rearward ends of the strut hub 60 by way of resilient bushings 63 at one end thereof. The other end of the rearward suspension arm 62 is connected by way of a resilient bushing 64a to a rearward sub-frame 65a constituting one part of the vehicle body. Similarly, the other end of the forward suspension arm 62 is connected by way of a resilient bushing 64b to a forward sub-frame 65b constituting one part of the vehicle body. The central axes of the bushings 64a and 64b are aligned with each other in the longitudinal direction of the vehicle body and the strut hub 60 can be vertically swung about the line passing through the central axes of the bushings 64a and 64b. A wheel hub WH supporting the left rear wheel LR is connected to the strut hub 60 by way of first and second resilient bushings R1 and R2, and a single ball joint BJ which permits pivotal movement of the wheel hub WH about a point with respect to the strut hub 60.

As in the embodiment shown in FIG. 9, a stabilizer ST' is disposed between the left wheel hub WH and the right wheel hub on the forward side thereof. The stabilizer ST has a laterally extending body portion SB' which acts as a torsion bar and a pair of arm portions SA' extending rearwardly from opposite ends of the body portion SB'. The body portion SB' of the stabilizer ST' is supported near the ends thereof by a pair of resilient bushings SR which are mounted on the vehicle body by way of control links SC to permit rotation of the stabilizer ST' about the body portion SB'. The wheel hub WH is provided with an arm-like extension HA' extending forwardly therefrom and the arm portion SA' of the stabilizer ST' is connected with the free end of the stabilizer ST' at a junction point JP thereon.

When the rear wheel LR bumps, the wheel hub WH is swung upwardly with respect to the vehicle body about the swinging axis of the strut hub 60, i.e., the line passing through the central axes of the bushings 64a and 64b, to push upwardly the end of the arm portion SA' of the stabilizer ST'.

As in the embodiment shown in FIG. 9, the junction point JP on the wheel hub WH is positioned below the horizontal plane including the swinging axis of the strut hub 60 and on the forward side of the ball joint BJ. Accordingly, the rear wheel LR is caused to toe in upon bump thereof in the same manner as that in the embodiment shown in FIG. 9.

As will be apparent to those skilled in the art from the description above, when the junction point JP on the wheel hub WH is above the ball joint BJ in each of the embodiments shown in FIGS. 9 and 10, the wheel hub WH is also displaced about the ball joint BJ in the counterclockwise direction as seen from the rear of the vehicle body by the inwardly directed counterforce of the stabilizer ST'. That is, by locating the junction point JP above the ball joint BJ or connecting the wheel hub WH and the arm portion SA' of the stabilizer ST' above the ball joint BJ, the rear wheel LR can be tilted in the direction of negative camber upon bump thereof.

Figure 11:
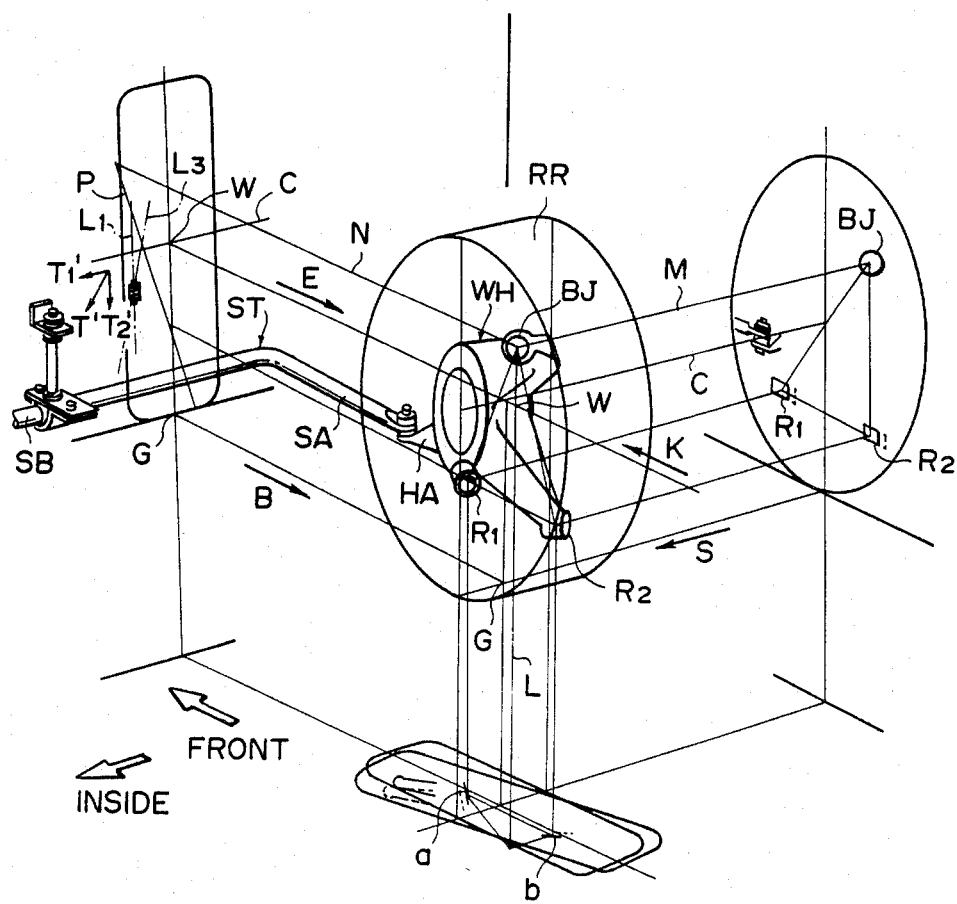
FIG. 11 is a combined schematic view similar to FIG. 3 but of a rear-suspension mechanism in accordance with still another embodiment of the present invention.

In the embodiment shown in FIG. 11, the wheel hub WH is provided with an arm-like extension HA extending forwardly therefrom. The stabilizer ST is disposed on the forward side of the wheel hub WH with its arm portion SA extending rearwardly from the body portion SB. The end of the arm portion SA is connected to the arm-like extension HA at a junction point JP on the arm-like extension HA. The wheel hub WH is connected to a body side support member (not shown) such as a semi trailing arm of the semi trailing type rear-suspension by way of a single ball joint BJ and a pair of resilient bushings R1 and R2. The junction point JP is positioned below the horizontal plane including the swinging axis of the body side support member and on the forward side of the ball joint BJ. The ball joint BJ is in quadrant I, and the bushings R1 and R2 are in quadrant III and IV, respectively. The central axes a and b of the bushings R1 and R2 are directed to displace the wheel hub WH in response to the counterclockwise displacement of the same about the horizontal axis M. That is, the central axis a of the first bushing R1 is directed rearwardly inwardly, while the central axis b of the second bushing R2 is directed rearwardly outwardly. The first bushing R1 may be positioned in quadrant II to extend in a horizontal plane or with its forward part positioned lower than its rearward part. In this case, the central axis a of the first bushing R1 is directed forwardly inwardly. Further in the embodiment shown in FIG. 11, the plane including the centers of the ball joint BJ and the bushings R1 and R2 is outwardly offset from the treading point G of the wheel RR and is inwardly offset from the wheel center W.

When the rear wheel RR bumps and the wheel hub WH is swung upwardly with respect to the vehicle body about the swinging axis of the body side support member, the junction point JP on the arm-like extension HA tends to move along a path indicated at L3 in the projection from the rear of the vehicle body, while the connected end of the arm portion SA of the stabilizer ST tends to move along a path indicated at L1 in the same projection. As shown in the projection, the path L1 along which the connected end of the arm portion SA tends to move is vertical as viewed from the rear, while the path L3 along which the junction point JP tends to move extends from the rest position thereof inclined outwardly with respect to the path L1. Therefore, an upwardly outwardly directed force is exerted on the arm portion SA of the stabilizer ST to produce a counterforce T' therein. As shown in the projection from the rear in FIG. 11, the counterforce T' is directed downwardly inwardly, and accordingly includes an inwardly directed horizontal component T1' and a downwardly directed vertical component T2'. When the rear wheel RR bumps, the forward part of the wheel hub WH is pulled inwardly by the inwardly directed horizontal component T1' of the counterforce T' and is displaced in the direction of toe-in about the vertical axis L since the junction point JP at which the counterforce T' acts on the wheel hub WH is on the forward side of the ball joint BJ, whereby the wheel RR is caused to toe-in.

Further, a turning moment to displace the wheel hub in the counterclockwise direction about the horizontal axis M is generated by the downwardly directed vertical component T2' since the junction point JP is on the forward side of the ball joint BJ. When the wheel hub WH is displaced counterclockwisely about the horizontal axis M, the wheel hub WH is displaced in the direction of toe-in through the guiding effect of the bushings R1 and R2.

When the lateral force S is exerted on the treading point G from outside to inside either during cornering or during straight travel, a turning moment in the counterclockwise direction as seen from above is generated about the vertical axis L since the ball joint BJ is in the rear of the wheel center W, i.e., in quadrant I, and accordingly the wheel hub WH is displaced in the direction of toe-in deforming the bushings R1 and R2, whereby the wheel RR is caused to toe in. When the outer rear wheel bumps during cornering, since the lateral force S is exerted on the outer rear wheel at the same time, the outer rear wheel can be effectively caused to toe in, during cornering, by both the counterforce of the stabilizer ST and the counterclockwise turning moment about the vertical axis L generated by the lateral force S.

Figure 12:
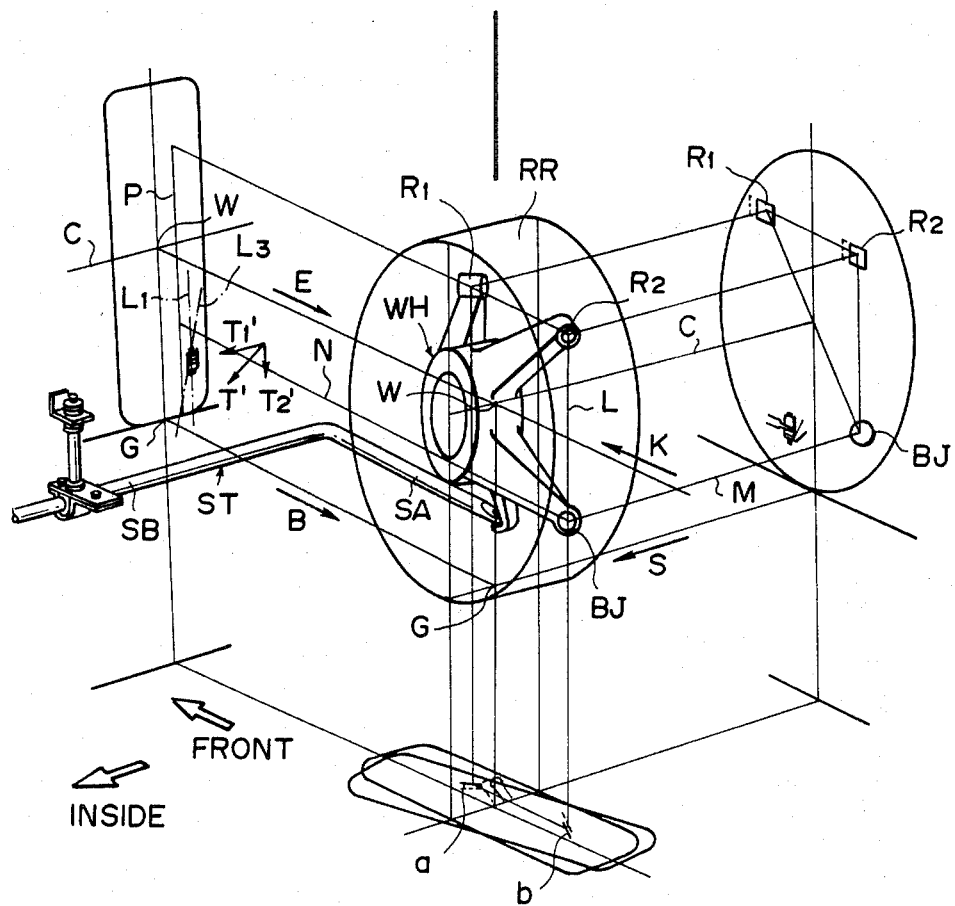
FIG. 12 is a combined schematic view similar to FIG. 3 but of a rear-suspension mechanism in accordance with still another embodiment of the present invention.

In the embodiment shown in FIG. 12, the ball joint BJ is in quadrant IV, and the bushings R1 and R2 are in quadrant II and I, respectively. The plane P including the centers of the ball joint BJ and the bushings R1 and R2 is outwardly offset from both the treading point G of the wheel RR and the wheel center W. The central axis a of the first bushing R1 is forwardly inwardly directed and the central axis b of the second bushing R2 is forwardly outwardly directed to displace the wheel hub WH in the direction of toe-in in response to the counterclockwise displacement of the wheel hub WH about the horizontal axis M. When the first bushing R1 is positioned in quadrant III to extend in a horizontal plane or with its forward part positioned higher than its rearward part, the central axis of the first bushing R1 is directed rearwardly inwardly.

The operation of this embodiment is substantially the same as that of the embodiment shown in FIG. 11.

What is claimed is:

1. A vehicle rear suspension mechanism for use with a vehicle body having rear wheels, said mechanism comprising:

two body side support members connected to the vehicle body for swinging movement about swinging axes substantially in a horizontal plane;

wheel supports for supporting the rear wheels for rotation, each wheel support being connected to one body side support member by way of a single ball joint which permits pivotal movement of the wheel support about a point with respect to the body side support member, and at least one resilient bushing which resiliently connects the wheel support to the body side support member; and a stabilizer which has a body portion extending substantially in the transverse direction of the vehicle body and arm portions extending from opposite ends of the body portion substantially in the longitudinal direction of the vehicle body, each arm portion being connected to one wheel support at a junction point thereon, the stabilizer being supported on the vehicle body for rotation about the longitudinal axis of the vehicle body portion so that the connected end of each arm portion tends to move along an arcuate path in a vertical plan extending substantially in the longitudinal direction of the vehicle body when pushed upwardly by the wheel support, and the junction point on the wheel support tends to move along an arcuate path in a vertical plane extending substantially in the transverse direction of the vehicle body when the rear wheel on the wheel support bumps and the wheel support is swung upwardly together with the body side support member with respect to the vehicle body, the position of each wheel support being controlled with respect to the body side support member by a deformation of the resilient bushing under a counterforce of the stabilizer produced against a force exerted thereon substantially in the transverse direction of the vehicle body when the rear wheel on the wheel support bumps.

2. A vehicle rear-suspension mechanism as defined in claim 1 in which said junction point on the wheel support is not below the horizontal plane including the swinging axis of the body side support member and on the rearward side of said ball joint so that said arcuate path along which the junction point tends to move is inside the vertical plane in which the connected end of the arm portion of the stabilizer tends to move and an inwardly directed force is exerted on the arm portion of the stabilizer to produce an outwardly directed counterforce therein when the wheel on the wheel hub bumps, the rearward part of the wheel support being pushed outwardly by the outwardly directed counterforce of the stabilizer so that the wheel support is displaced about the vertical axis passing through the ball joint in the direction of toe-in.

3. A vehicle rear-suspension mechanism as defined in claim 2 in which said junction point on the wheel support is below the ball joint.

4. A vehicle rear-suspension mechanism as defined in claim 2 or 3 in which said ball joint is on the rearward side of the wheel center of the rear wheel.

5. A vehicle rear-suspension mechanism as defined in claim 4 in which said wheel support is connected to the body side support member by way of a single ball joint and a pair of resilient bushings and said wheel support is adapted to be displaced in the clockwise direction about the horizontal axis passing through the ball joint as seen from the left hand side of the vehicle body, at least one of said resilient bushings being on the forward side of the wheel center, said resilient bushings being arranged to displace the wheel support in the direction of toe-in in response to the clockwise displacement of the wheel hub about said horizontal axis.

6. A vehicle rear-suspension mechanism as defined in claim 5 in which said ball joint is in quadrant IV, and the resilient bushings are respectively in quadrant I and II on a coordinate plane having its origin on the wheel center of the rear wheel, its abscissa on the horizontal line passing through the wheel center and its ordinate on the vertical line passing through the wheel center as viewed from the left hand side of the vehicle body, the resilient bushing in quadrant I being directed rearwardly outwardly and the resilient bushing in quadrant II being directed rearwardly inwardly to displace the wheel support in the direction of toe-in in response to the clockwise displacement of the same about said horizontal axis passing through the ball joint.

7. A vehicle rear-suspension mechanism as defined in claim 6 in which the intersectional line between the plane including the centers of the ball joint and the bushings, and the vertical plane including the central axis of the rear wheel is outwardly offset from the treading point of the rear wheel at the height thereof and is inwardly offset from the center of the rear wheel at the height thereof.

8. A vehicle rear-suspension mechanism as defined in claim 7 in which one of said bushings is provided with a stopper in front of it to restrict a counterclockwise displacement of the wheel support about the horizontal axis passing through the ball joint.

9. A vehicle rear-suspension mechanism as defined in claim 6 in which the intersectional line between the plane including the centers of the ball joint and the bushings, and the vertical plane including the central axis of the rear wheel is outwardly offset from both the treading point of the rear wheel and the center of the rear wheel at the height thereof.

10. A vehicle rear-suspension mechanism as defined in claim 1 in which said junction point on the wheel support is below the horizontal plane including the swinging axis of the body side support member and on the forward side of said ball joint so that said arcuate path along which the junction point tends to move is outside the vertical plane in which the connected end of the arm portion of the stabilizer tends to move and an outwardly directed force is exerted on the arm portion of the stabilizer to produce an inwardly directed counterforce therein when the wheel on the wheel hub bumps, the forward part of the wheel support being pulled inwardly by the inwardly directed counterforce of the stabilizer so that the wheel support is displaced about the vertical axis passing through the ball joint in the direction of toe-in.

11. A vehicle rear-suspension mechanism as defined in claim 10 in which said junction point on the wheel hub is above the ball joint.

12. A vehicle rear-suspension mechanism as defined in claim 9 or 11 in which said ball joint is on the rearward side of the wheel center of the rear wheel.

13. A vehicle rear-suspension mechanism as defined in claim 12 in which said wheel support is connected to the body side support member by way of a single ball joint and a pair of resilient bushings and said wheel support is adapted to be displaced in the counterclockwise direction about the horizontal axis passing through the ball joint as seen from the left hand side of the vehicle body, at least one of said resilient bushings being on the forward side of the wheel center, said resilient bushings being arranged to displace the wheel hub in the direction of toe-in in response to the counterclockwise displacement of the wheel support about said horizontal axis.

14. A vehicle rear-suspension mechanism as defined in claim 13 in which said ball joint is in quadrant IV, and the resilient bushings are respectively in quadrant I and II on a coordinate plane having its origin on the wheel center of the rear wheel, its abscissa on the horizontal line passing through the wheel center and its ordinate on the vertical line passing through the wheel center as viewed from the left hand side of the vehicle body, the resilient bushing in quadrant I being directed rearwardly inwardly and the resilient bushing in quadrant II being directed rearwardly outwardly to displace the wheel support in direction of toe-in in response to the counterclockwise displacement of the same about said horizontal axis passing through the ball joint.

15. A vehicle rear-suspention mechanism as defined in claim 14 in which the intersectional line between the plane including the centers of the ball joint and the bushings, and the vertical plane including the central axis of the rear wheel is outwardly offset from the treading point of the rear wheel at the height thereof and is inwardly offset from the center of the rear wheel at the height thereof.

16. A vehicle rear-suspension mechanism as defined in claim 14 in which the intersectional line between the plane including the centers of the ball joint and the bushings, and the vertical plane including the central axis of the rear wheel is outwardly offset from both the treading point of the rear wheel and the center of the rear wheel at the height thereof.

17. A vehicle rear-suspension mechanism as defined in claim 1 in which said junction point on the wheel support is on or above the horizontal plane including the swinging axis of the body side support member and below said ball joint so that said arcuate path along which the junction point tends to move is inside the vertical plane in which the connected end of the arm portion of the stabilizer tends to move and an inwardly directed force is exerted on the arm portion of the stabilizer to produce an outwardly directed counterforce therein when the wheel on the wheel support bumps, the lower part of the wheel support being pushed outwardly by the outwardly directed counterforce of the stabilizer so that the wheel support is displaced in the direction of negative camber.

18. A vehicle rear-suspention mechanism as defined in claim 1 in which said junction point on the wheel support is below the horizontal plane including the swinging axis of the body side support member and above said ball joint so that said arcuate path along which the junction point tends to move is outside the vertical plane in which the connected end of the arm portion of the stabilizer tends to move and an outwardly directed force is exerted on the arm portion of the stabilizer to produce an inwardly directed counterforce therein when the wheel on the wheel support bumps, the upper part of the wheel support being pulled inwardly by the inwardly directed counterforce of the stabilizer so that the wheel support is displaced in the direction of negative camber.

* * * * *